United States Patent
Hu et al.

(10) Patent No.: US 7,411,641 B2
(45) Date of Patent: Aug. 12, 2008

(54) LIQUID CRYSTAL DISPLAY PANEL AND LIQUID CRYSTAL DISPLAY MODULE

(75) Inventors: Cheng-Chung Hu, Taoyuan County (TW); Hsien-Chang Hsiao, Nantou County (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 458 days.

(21) Appl. No.: 10/904,402

(22) Filed: Nov. 9, 2004

(65) Prior Publication Data

US 2006/0098138 A1    May 11, 2006

(51) Int. Cl.
*G02F 1/1335* (2006.01)
(52) U.S. Cl. .............. 349/96; 349/64; 349/122
(58) Field of Classification Search .......... 349/57, 349/61, 64, 96, 112, 122, 137; 359/485, 359/490, 599
See application file for complete search history.

(56) References Cited

U.S. PATENT DOCUMENTS 6,339,501 B1 * 1/2002 Kameyama et al. ......... 359/485
2003/0112388 A1 * 6/2003 Jang et al. .................. 349/113
2004/0239834 A1 * 12/2004 Park et al. .................... 349/96

FOREIGN PATENT DOCUMENTS

| CN | 1266503 | 9/2000 |
|---|---|---|
| CN | 1271426 | 10/2000 |
| CN | 1478207 | 2/2004 |

* cited by examiner

*Primary Examiner*—Dung T. Nguyen
*Assistant Examiner*—Tai Duong
(74) *Attorney, Agent, or Firm*—Jianq Chyun IP Office

(57) ABSTRACT

A liquid crystal display (LCD) panel and module is provided. The LCD panel comprises a thin film transistor (TFT) array substrate, a color filter substrate, a liquid crystal layer, an upper polarizing plate and a lower polarizing plate. The color filter substrate is disposed over the TFT array substrate, and the liquid crystal layer is disposed between the TFT array substrate and the color filter substrate. In addition, the upper polarizing plate is disposed over the color filter substrate. Moreover, the lower polarizing plate is disposed over the TFT array substrate, and the lower polarizing plate includes, for example, a polarizer and a light scattering layer disposed over a surface of the polarizer.

6 Claims, 5 Drawing Sheets

LIQUID CRYSTAL DISPLAY PANEL AND LIQUID CRYSTAL DISPLAY MODULE

BACKGROUND OF THE INVENTION

1. Field of the Invention

The present invention generally relates to a display panel. More particularly, the present invention relates to a liquid crystal display panel and a liquid crystal display module.

2. Description of Related Art

Recently, a variety of factories have invested great efforts on the development of display device as the market demand of display device has grown rapidly. Conventionally, since the cathode ray tube (CRT) is fully developed and has good display quality, the CRT has been adopted in a variety of application. However, the CRT has the disadvantages of high power consumption, heavy weight, large size and harmful radiation and therefore cannot meet the requirement of environmental protection requirement. Accordingly, the thin film transistor liquid crystal display (TFT-LCD) has been developed and has become the major trend of the display device due to the advantages of high definition, small size, thinness, low power consumption, radiation free, etc.

The conventional TFT-LCD module mainly includes a liquid crystal display (LCD) panel and a back light module. The liquid crystal display panel constitutes a TFT array substrate, a color filter substrate and a liquid crystal layer disposed between the two substrates. The back light module is adopted as a surface light source of the LCD panel for displaying image from the TFT-LCD module. In addition, an upper polarizing plate and a lower polarizing plate are usually disposed over the two opposite surfaces of the LCD panel to enhance the display quality of the TFT-LCD module. Moreover, a plurality of optical films is disposed between the LCD panel and the surface light source of the back light module to enhance the brightness of the TFT-LCD module.

Accordingly, in order to enhance the display contrast of the LCD panel and to make the appearance of the LCD panel more shiny, the upper polarizing plate of the LCD panel is generally constructed by glare type polarizing plate, and the lower polarizing plate of the LCD panel is generally constructed by conventional polarizing plate. However, after a light from the surface light source of the back light module passes through the optical films and the LCD panel, generally a plurality of mutually parallelized moire are generated in the display area of the LCD panel. It is noted that, since the moire may be observed by human eyes, the displaying quality of the LCD panel is reduced.

SUMMARY OF THE INVENTION

Accordingly, the present invention is directed to liquid crystal display (LCD) panel for reducing the generation of moire in the display area of the LCD panel and thereby enhance the displaying quality of the LCD panel.

In addition, the present invention is also directed to a liquid crystal display (LCD) module for reducing the generation of moire in the display area of the LCD module and thereby enhance the displaying quality of the LCD module.

According to one embodiment of the present invention, a liquid crystal display panel comprising, for example but not limited to, a thin film transistor (TFT) array substrate, a color filter substrate, a liquid crystal layer, an upper polarizing plate and a lower polarizing plate is provided. The color filter substrate is disposed over the TFT array substrate. The liquid crystal layer is disposed between the TFT array substrate and the color filter substrate. In addition, the upper polarizing plate is disposed over the color filter substrate. Moreover, the lower polarizing plate is disposed over the TFT array substrate. The lower polarizing plate comprises, for example but not limited to, a polarizer and a light scattering layer disposed over a surface of the polarizer.

According to one embodiment of the present invention, a liquid crystal display module comprising, for example but not limited to, a back light module and a liquid crystal display panel is provided. The liquid crystal display panel is disposed over the back light module. In addition, the back light module comprises, for example, an optical film (or an optical sheet) and a back light source. Moreover, the liquid crystal display panel comprises, for example but not limited to, a thin film transistor (TFT) array substrate, a color filter substrate, a liquid crystal layer, an upper polarizing plate and a lower polarizing plate. The color filter substrate is disposed over the TFT array substrate, and the liquid crystal layer is disposed between the TFT array substrate and the color filter substrate. The upper polarizing plate is disposed over the color filter substrate, and the lower polarizing plate is disposed over the TFT array substrate. Furthermore, the lower polarizing plate comprises, for example but not limited to, a polarizer and a light scattering layer disposed over a surface of the polarizer.

Accordingly, a lower polarizing plate with light scattering layer is provided in the liquid crystal display panel and liquid crystal display module of the present invention. Therefore, the generation of moire in the display area can be effectively reduced by the light scattering layer, and thus the displaying quality of the liquid crystal display panel and liquid crystal display module is enhanced.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF THE EMBODIMENTS

The present invention will be described fully hereinafter with reference to the accompanying drawings, in which preferred embodiments of the present invention are illustrated. The present invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements in the accompanying drawings throughout.

Figure 1:
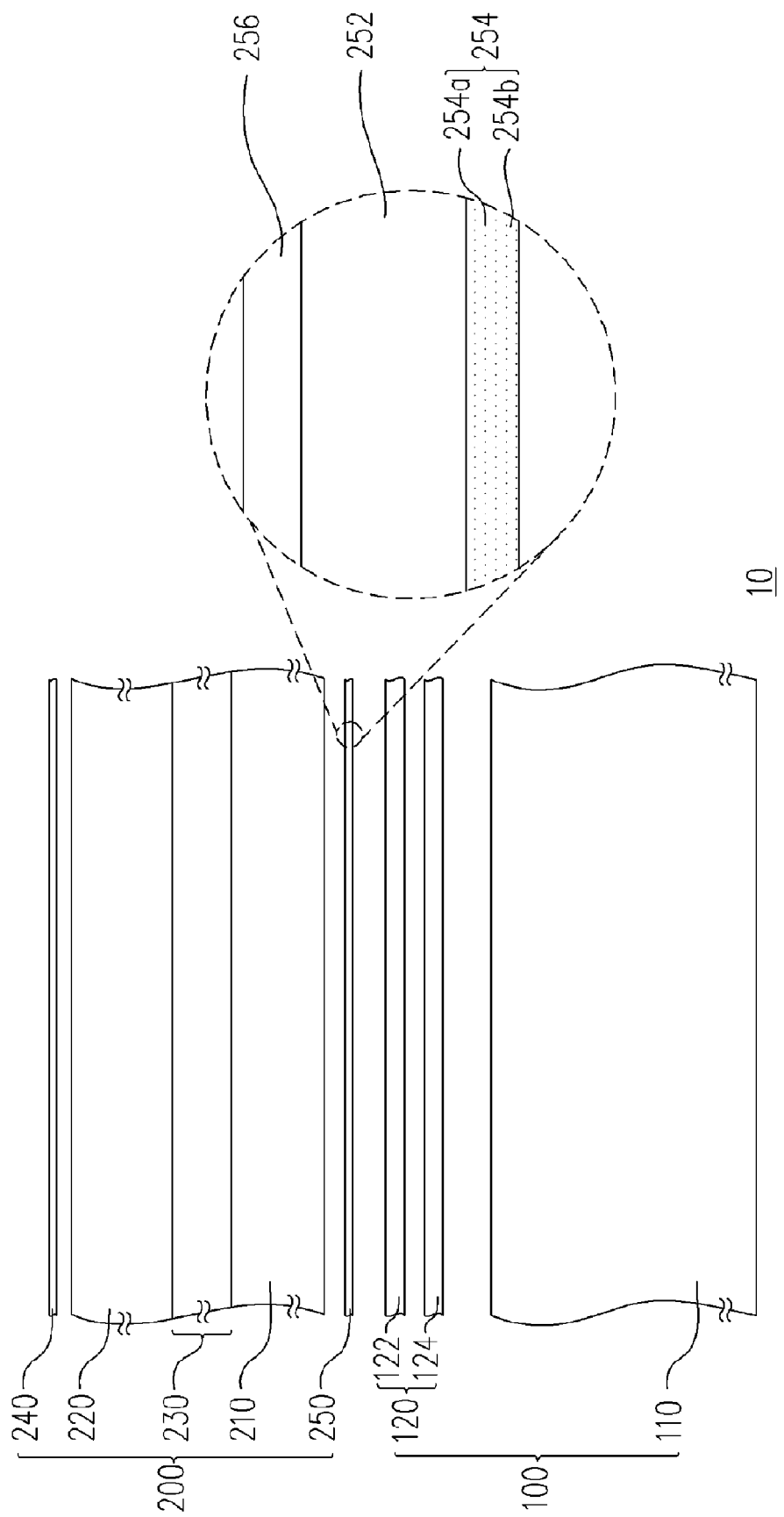
FIG. 1 is a schematic cross-sectional view illustrating a liquid crystal display module according to one embodiment of the present invention.

FIG. 1 is a schematic cross-section view illustrating a liquid crystal display module according to one embodiment of the present invention. Referring to FIG. 1, the liquid crystal display (LCD) module 10 comprises, for example but not limited to, a back light module 100 and a liquid crystal display (LCD) panel 200. The LCD panel 200 is disposed over the back light module 100. In addition, the back light module 100 comprises, for example, a back light source 110 and an optical film (or optical sheet) 120. In one embodiment of the present invention, the optical film 120 comprises, for example but not limited to, a light collecting sheet 122 and a diffusion sheet 124. The light collecting sheet 122 comprises, for example but not limited to, a prism sheet. Furthermore, the back light source 110 comprises, for example but not limited to, a side type back light source or a direct type back light source.

Moreover, the LCD panel 200 comprises, for example but not limited to, a thin film transistor (TFT) array substrate 210, a color filter substrate 220, a liquid crystal layer 230, an upper polarizing plate 240 and a lower polarizing plate 250. The color filter substrate 220 is disposed over the TFT array substrate 210. The liquid crystal layer 230 is disposed between the TFT array substrate 210 and the color filter substrate 220. Furthermore, the upper polarizing plate 240 is disposed over a surface of the color filter substrate 220, and the lower polarizing plate 250 is disposed over a surface of the TFT array substrate 210.

Referring to the enlarged area of FIG. 1, the lower polarizing plate 250 comprises, for example but not limited to, a polarizer 252 and a light scattering layer 254. The light scattering layer 254 is constructed by, for example but not limited to, a transparent resin 254b and a plurality of light scattering particles 254a distributed in transparent resin 254b. In addition, the transparent resin 254b comprises, for example but not limited to, ultraviolet (UV) light hardening resin or other light hardening resin. Moreover, the refractive indices of the light scattering particle 254a and the transparent resin 254b are, for example, different. The light scattering particle 254a comprises, for example but not limited to, transparent particles only with a single refractive index. Alternatively, the light scattering particle 254a may comprise transparent particles with a plurality of different refractive indices. Furthermore, the lower polarizing plate 250 is, for example but not limited to, adhered over the TFT array substrate 210 via an adhesion layer 256. However, in another embodiment of the present invention, the lower polarizing plate 250 may be disposed over the TFT array substrate 210 by using another method except for by using the adhesion layer 256.

Referring to FIG. 1, in the present invention, the light scattering particles 254a disposed in the light scattering layer 254 of the lower polarizing plate 250 is provided for scattering the light from the surface light source of the back light source 110. Therefore, in comparison with the conventional technology, after the light from the surface light source of the back light source 110 passes through the optical film sheet 120, it is difficult to generate moire in the LCD panel 200. Therefore, the user will not observe miore in the display area of the LCD panel 200. In the present invention, the upper polarizing plate 240 comprises conventional polarizing plate or any applicable polarizing plate. In one embodiment of the present invention, in order to make the appearances of the LCD panel 200 and the LCD module 10 more shiny and to enhance the display contrasts of the LCD panel 200 and the LCD module 10, the upper polarizing plate 140 comprises, for example, glare type polarizing plate. Furthermore, the surface treatment of the glare type polarizing plate comprises hardening and antireflection treatment.

It is noted that in the embodiment described above, the lower polarizing plate of the LCD panel and the LCD module comprises the polarizing plate having the light scattering layer. Therefore, the generation of moire in the LCD module is effectively reduced. Hereinafter, a lower polarizing plate of the LCD panel and the LCD module for achieving the effect reducing the generation of moire will be described.

Figure 2A:
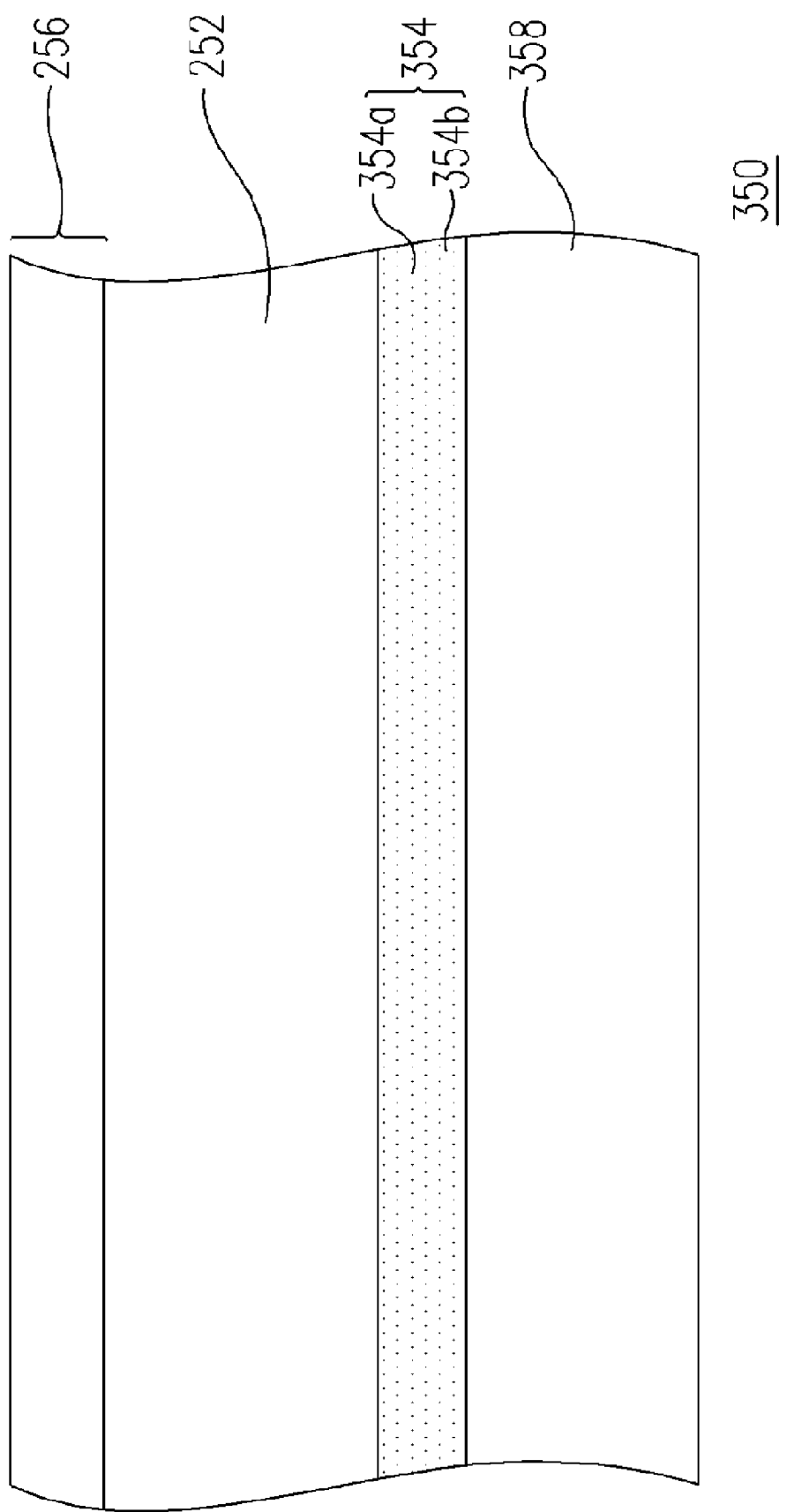
FIG. 2A, FIG. 2B, FIG. 2C and FIG. 2D are schematic cross-section views illustrating lower polarizing plates according to another embodiments of the present invention.

FIG. 2A is schematic cross-section view illustrating a lower polarizing plate according to another embodiment of the present invention. Referring to FIG. 2A, the lower polarizing plate 350 is also adhered over a surface of the thin film transistor (TFT) array substrate 210 (as illustrated in FIG. 1). In the present embodiment, the lower polarizing plate 350 comprises, for example but not limited to, a polarizer 252, a light scattering layer 354 and an optical film 358. The light scattering layer 354 is adhered over a surface of the polarizer 252. The light scattering layer 354 is constructed by, for example but not limited to, an adhesion material 354b and a plurality of light scattering particles 354a distributed in the adhesion material 354b. The optical film 358 is adhered over a surface of the polarizer 252 via the adhesion material 354b of the light scattering layer 354. In one embodiment of the present invention, the optical film 358 comprises, for example but not limited to, a brightness enhancement film (BEF) or a dual brightness enhanced film (DBEF). In addition, an adhesion layer 256 may be further coated on another surface of the polarizer 252 to adhere the lower polarizing plate 350 over the surface of the TFT array substrate 210 (similar to that illustrated in FIG. 1).

Figure 2B:
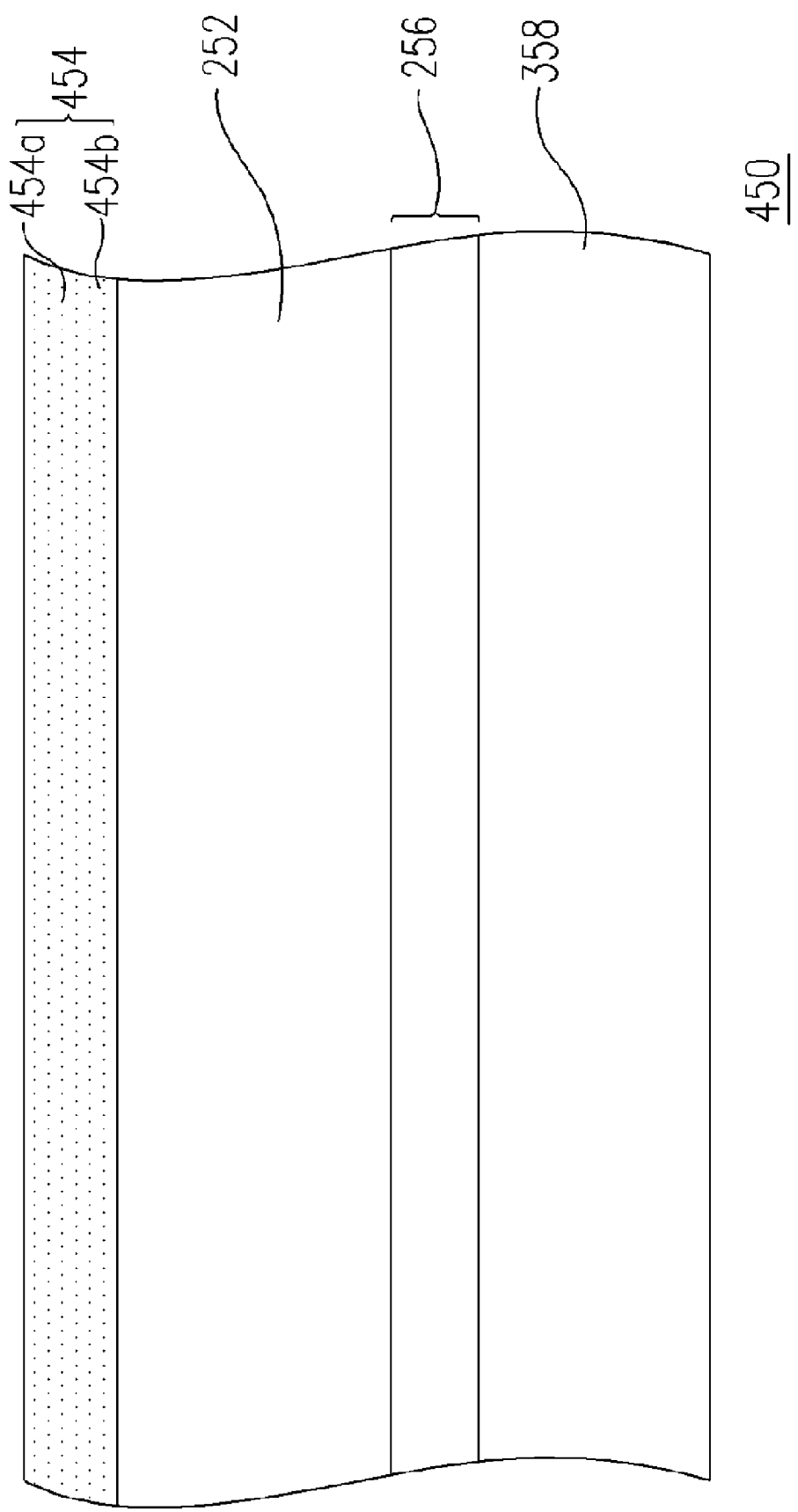

In another embodiment of the present invention, the lower polarizing plate may be designed as shown in FIG. 2B. The lower polarizing plate 450 comprises, for example but not limited to, a polarizer 252, a light scattering layer 454, an optical film 358 and a adhesion layer 256. The light scattering layer 454 is adhered over a surface of the polarizer 252. The light scattering layer 454 is constructed by, for example but not limited to, an adhesion material 454b and a plurality of light scattering particles 454a distributed in the adhesion material 454b. Moreover, the adhesion layer 256 is coated on another surface of the polarizer 252. The optical film 358 is adhered over the polarizer 252 via the adhesion layer 256. The lower polarizing plate 450 is, for example but not limited to, adhered over the surface of the TFT array substrate 210 via the adhesion material 454b of the light scattering layer 454 (similar to that illustrated in FIG. 1).

Figure 2C:
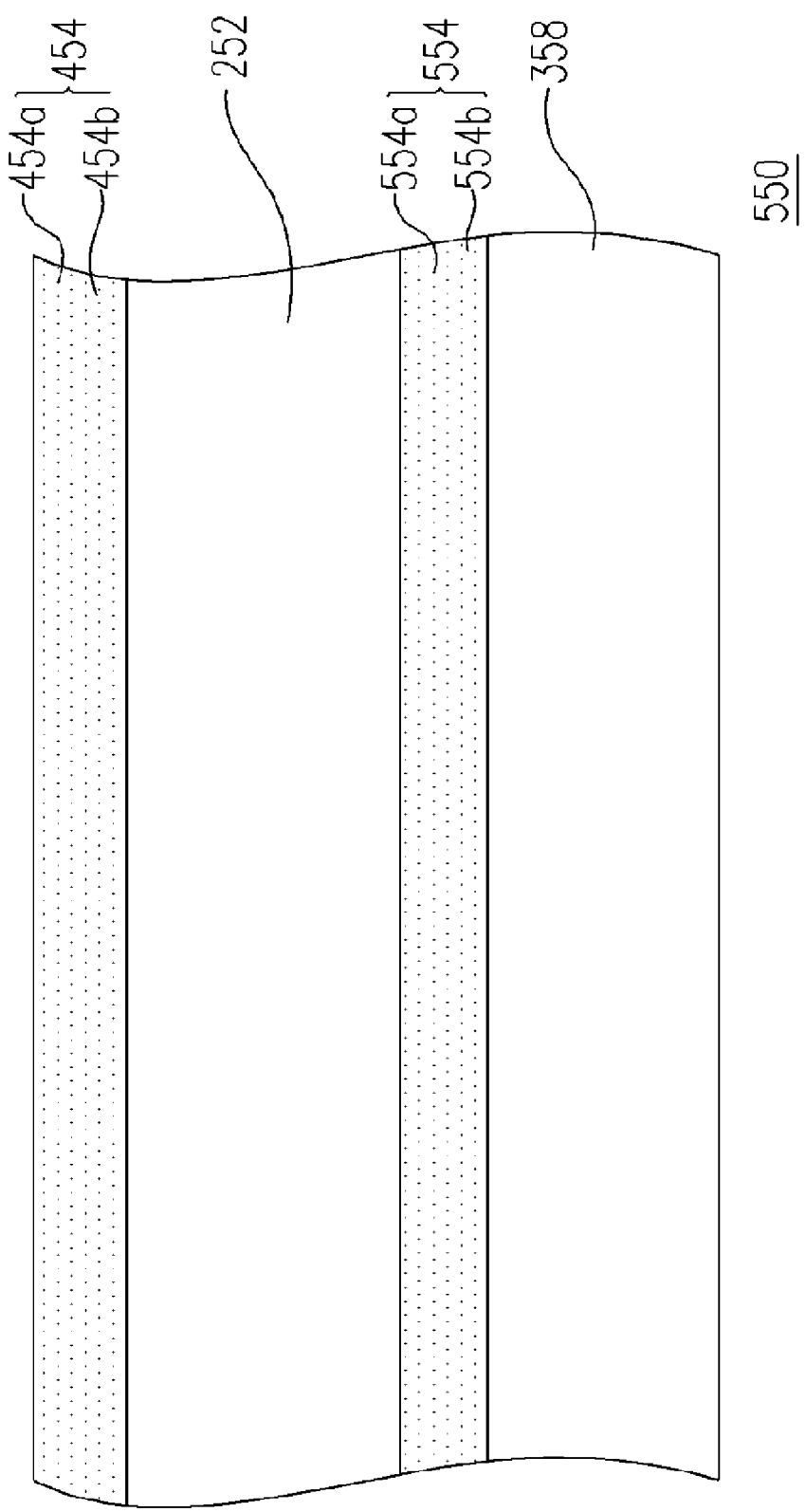

In another embodiment of the present invention, the lower polarizing plate comprises two light scattering layers as shown in FIG. 2C. In the present embodiment, the lower polarizing plate 550 comprises, for example but not limited to, a polarizer 252, a light scattering layer 454, a light scattering layer 554 and an optical film 358. The light scattering layer 554 is adhered over a surface of the polarizer 252. The light scattering layer 554 is constructed by, for example but not limited to, an adhesion material 554b and a plurality of light scattering particles 554a distributed in the adhesion material 554b. The optical film 358 is adhered over the surface of the polarizer 252 via the adhesion material 554b of the light scattering layer 554. In addition, the light scattering layer 454 is adhered over another surface of the polarizer 252. The light scattering layer 454 is constructed by, for example but not limited to, an adhesion material 454b and a plurality of light scattering particles 454a distributed in the adhesion material 454b. The lower polarizing plate 550 is, for example but not limited to, adhered over the surface of the TFT array substrate 210 via the adhesion material 454b of the light scattering layer 454 (similar to that illustrated in FIG. 1).

Figure 2D:
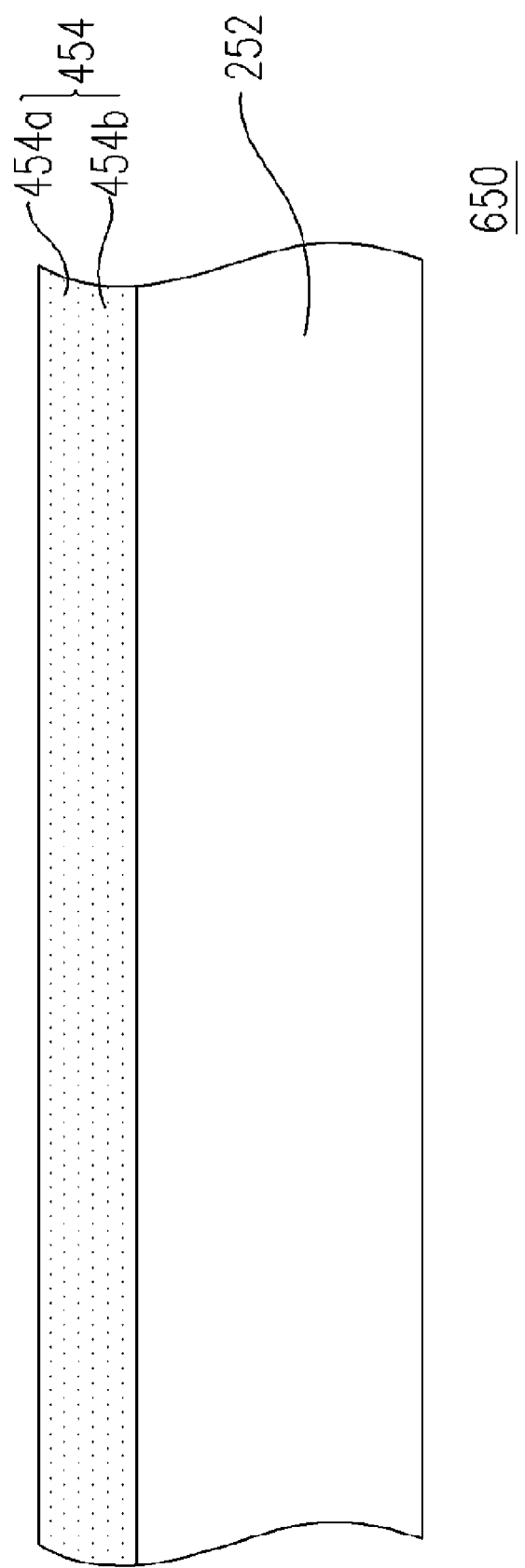

In another embodiment of the present invention, the lower polarizing plate may be designed as shown in FIG. 2D. In the present invention, the lower polarizing plate 650 comprises, for example but not limited to, a polarizer 252 and a light scattering layer 454. The light scattering layer 454 is adhered over a surface of the polarizer 252. The light scattering layer 454 is constructed by, for example but not limited to, an adhesion material 454b and a plurality of light scattering particles 454a distributed in the adhesion material 454b. The lower polarizing plate 650 is, for example but not limited to, adhered over the surface of the TFT array substrate 210 via the adhesion material 454b of the light scattering layer 454 (similar to that illustrated in FIG. 1).

Accordingly, the LCD panel and the LCD module of the present invention has the following advantages.

First, since the lower polarizing plate of the LCD panel and the LCD module of the present invention has a light scattering layer, the generation of moire in the LCD module can be effectively reduced. Therefore, the display quality of the LCD panel and the LCD module of the present invention is enhanced.

In addition, it is noted that the light scattering layer of the lower polarizing plate is constructed by, for example but not limited to, adhesion material and light scattering particles. Therefore, the light scattering layer may not only be provided for adhesion, but also may enhance the display quality of the LCD panel and the LCD module of the present invention.

Furthermore, in the LCD panel and the LCD module of the present invention, the lower polarizing plate further comprises optical film layer for enhancing the displaying quality. Moreover, the light scattering layer constructed by the adhesion material can be disposed between the optical film layer and the polarizer. In addition, the upper polarizing plate may also comprises glare type polarizing plate to make the appearance of the LCD panel and the LCD module more shiny.

The foregoing description of the preferred embodiment of the present invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A liquid crystal display (LCD) panel, comprising:
    a thin film transistor (TFT) array substrate;
    a color filter substrate, disposed over the TFT array substrate;
    a liquid crystal layer, disposed between the TFT array substrate and the color filter substrate;
    an upper polarizing plate, disposed over the color filter substrate;
    a lower polarizing plate, disposed over the TFT array substrate, wherein the lower polarizing plate comprises a polarizer and a first light scattering layer disposed over a surface of the polarizer, wherein the first light scattering layer comprises an adhesion material and a plurality of light scattering particles distributed in the adhesion material such that the first light scattering layer is directly adhered to the TFT array substrate; and
    an optical film and a second light scattering layer, wherein the second light scattering layer is disposed on another surface of the polarizer, and the optical film is adhered over the second light scattering layer.

2. The LCD panel of claim 1, wherein the optical film comprises a brightness enhancement film (BEF) or a dual brightness enhanced film (DBEF).

3. The LCD panel of claim 1, wherein the upper polarizing plate comprises glare type polarizing plate.

4. A liquid crystal display (LCD) module, comprises
    a back light module, comprising at least an optical film and a back light source;
    a liquid crystal display (LCD) panel, disposed over the back light module, wherein the LCD panel comprising:
    a thin film transistor (TFT) array substrate;
    a color filter substrate, disposed over the TFT array substrate;
    a liquid crystal layer, disposed between the TFT array substrate and the color filter substrate;
    an upper polarizing plate, disposed over the color filter substrate; and
    a lower polarizing plate, disposed over the TFT array substrate, wherein the lower polarizing plate comprises: a polarizer and a first light scattering layer disposed over a surface of the polarizer, wherein the first light scattering layer comprises an adhesion material and a plurality of light scattering particles distributed in the adhesion material such that the first light scattering layer is directly adhered to the UT array substrate; and
    another optical film and a second light scattering layer, wherein the second light scattering layer is disposed on another surface of the polarizer, and said another optical film is adhered over the second light scattering layer.

5. The LCD module of claim 4, wherein said another optical film comprises a brightness enhancement film (BEF) or a dual brightness enhanced film (DBEF).

6. The LCD module of claim 4, wherein the upper polarizing plate comprises glare type polarizing plate.

* * * * *